E. S. BOYER.
PLANT GROWTH PROMOTER.
APPLICATION FILED JUNE 28, 1915.
1,189,047.
Patented June 27, 1916.
6 SHEETS—SHEET 1.
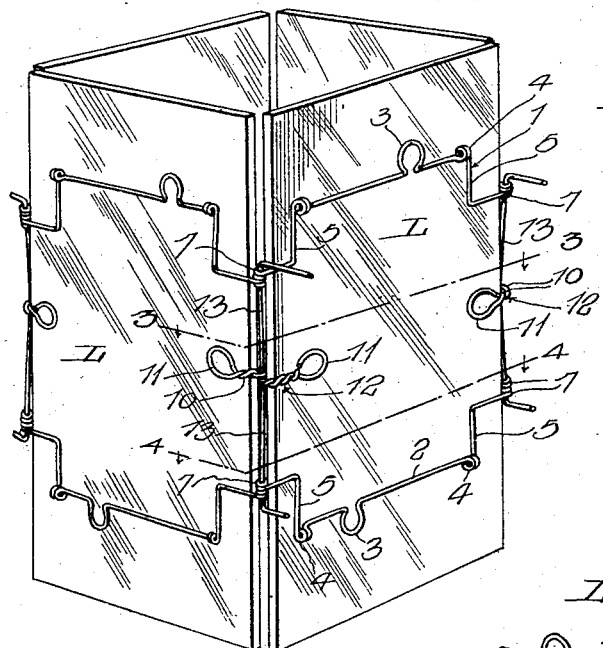
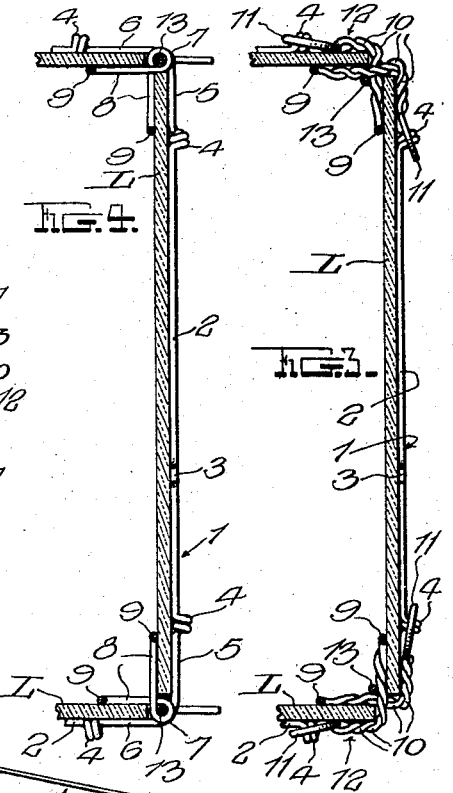
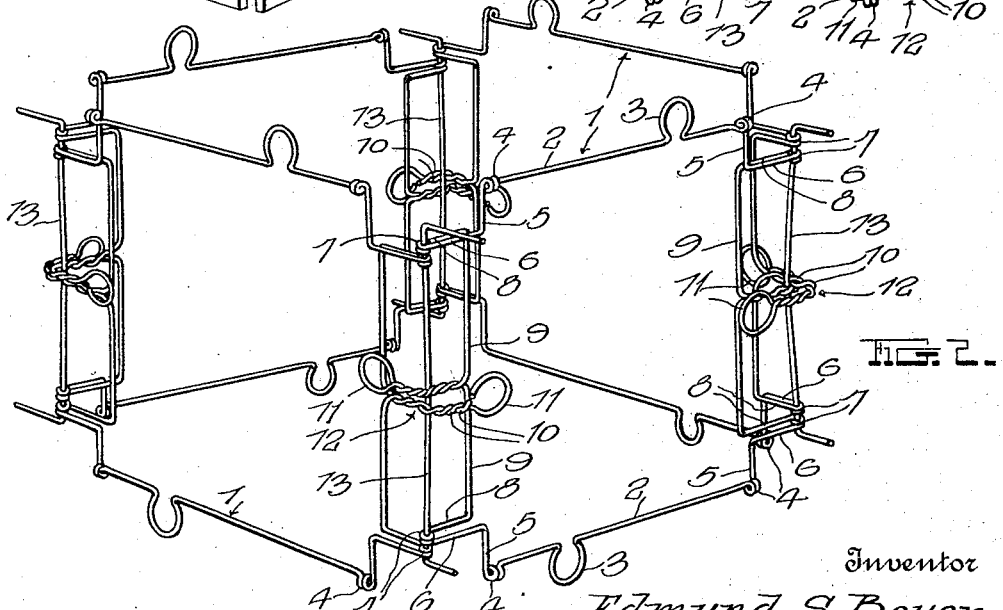
Witnesses
H. Woodard
Inventor
Edmund S. Boyer
By H. B. Wilson & Co.
Attorneys

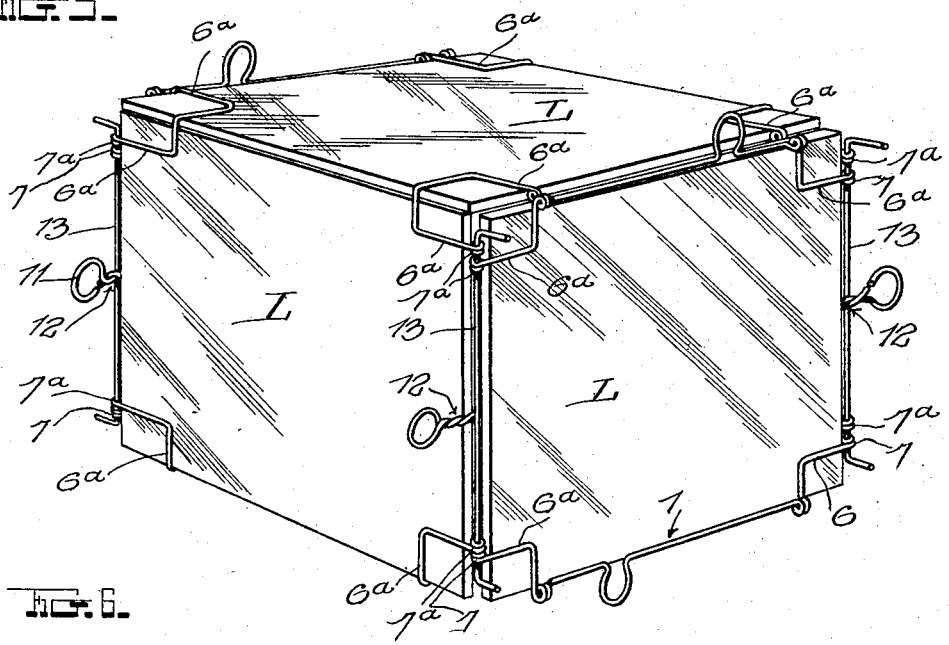

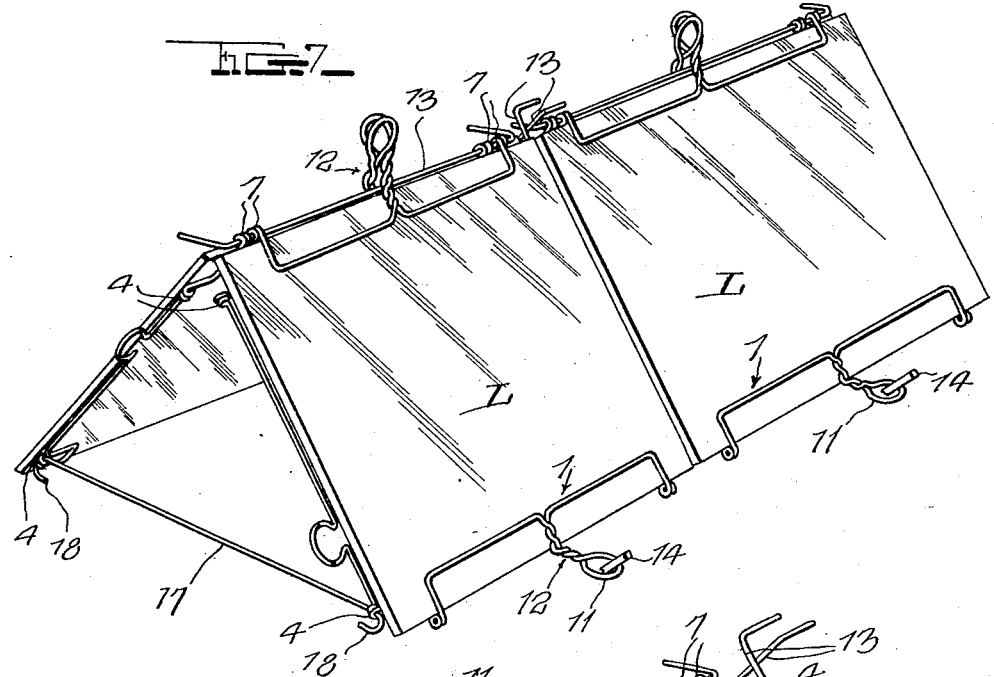
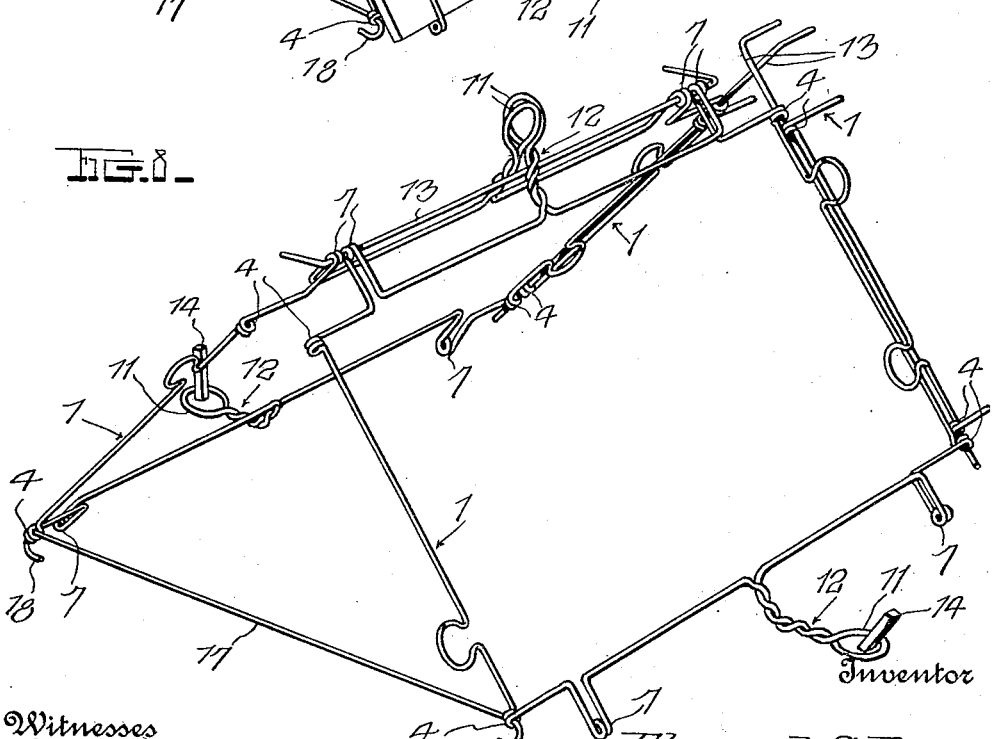

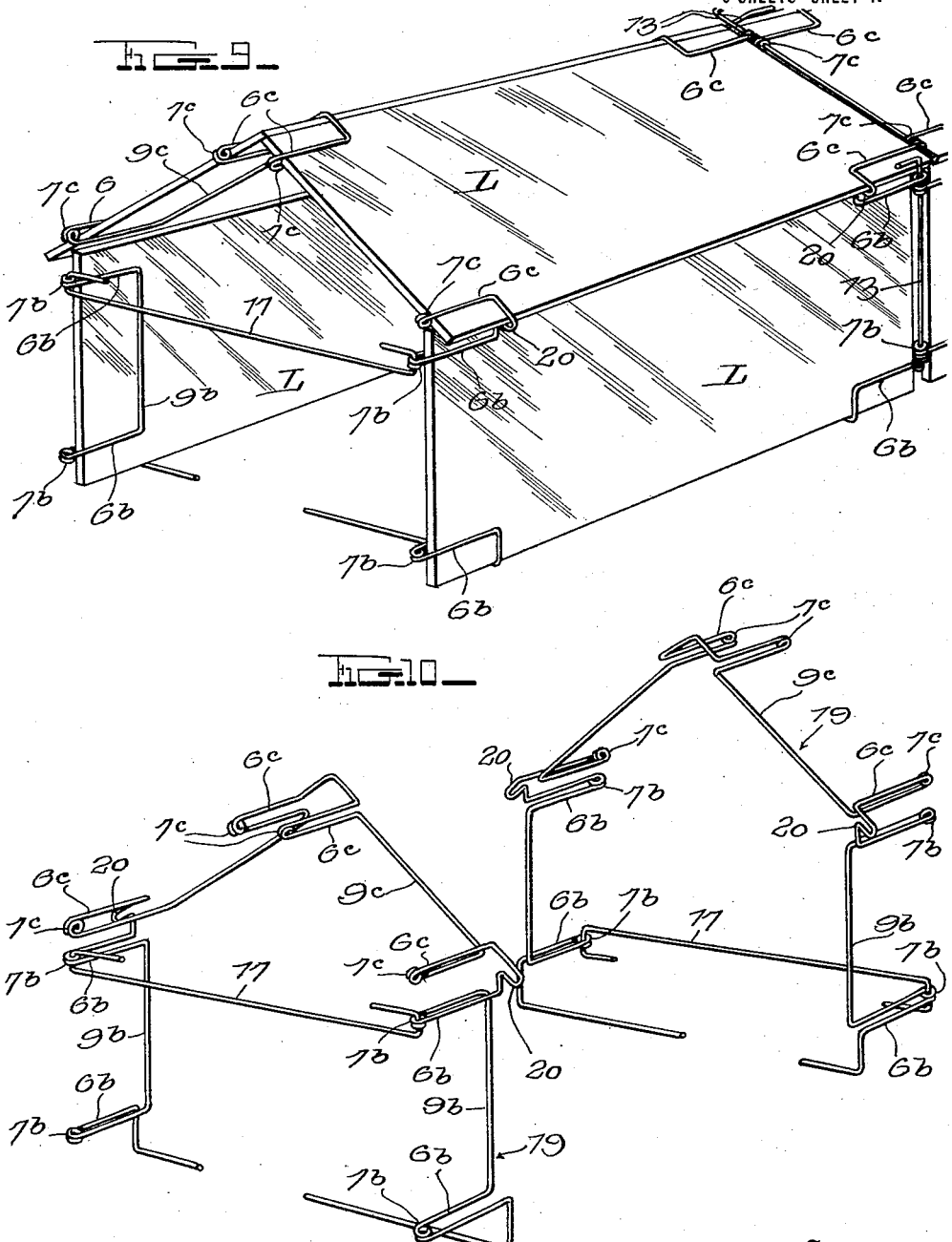

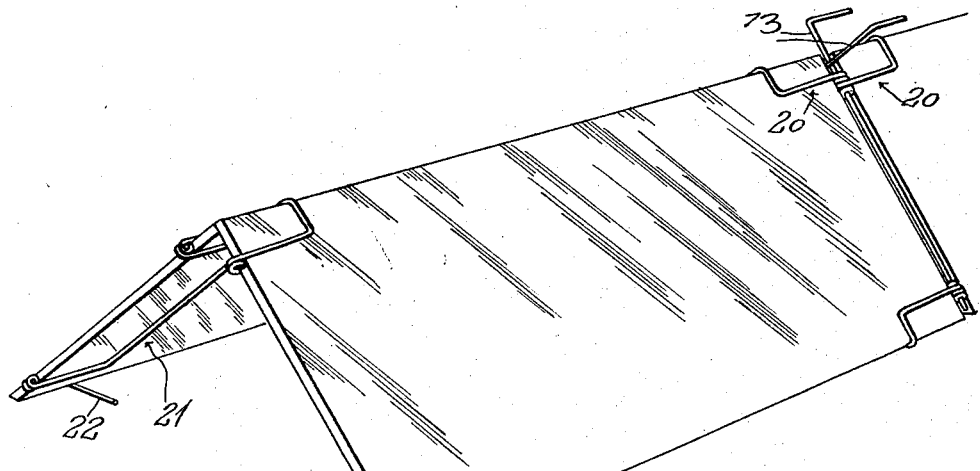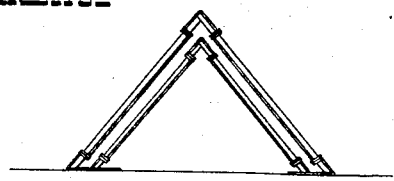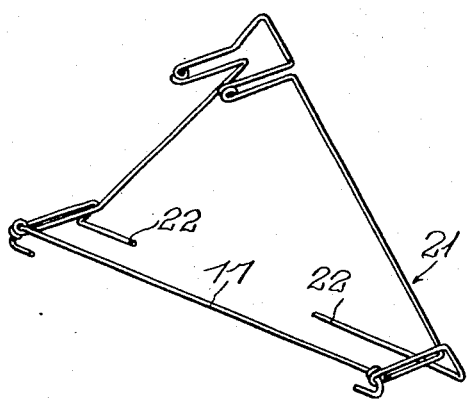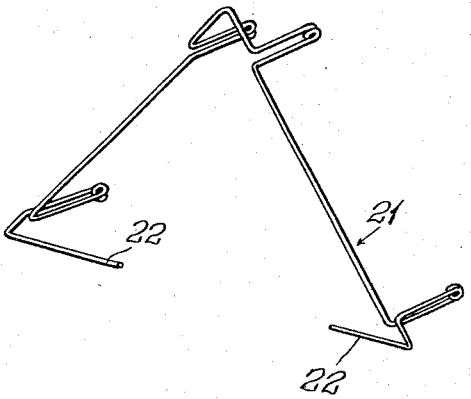

E. S. BOYER.
PLANT GROWTH PROMOTER.
APPLICATION FILED JUNE 28, 1915.
1,189,047.
Patented June 27, 1916.
6 SHEETS—SHEET 6.
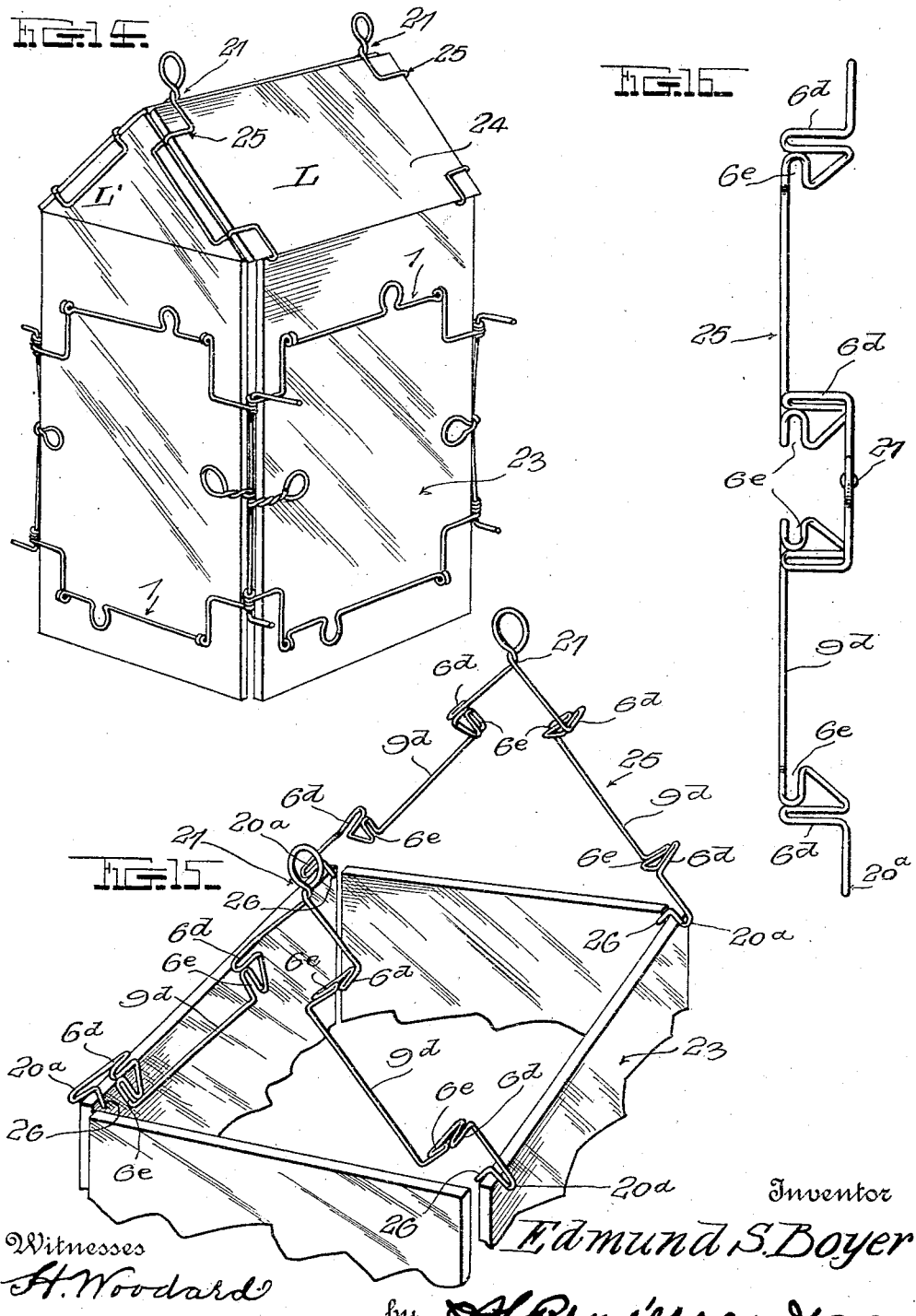
Witnesses
H. Woodard
Inventor
Edmund S. Boyer
by H. B. Willson &co
Attorneys

UNITED STATES PATENT OFFICE.

EDMUND S. BOYER, OF SOMERSWORTH, NEW HAMPSHIRE.

PLANT-GROWTH PROMOTER.

1,189,047.  Specification of Letters Patent.  Patented June 27, 1916.

Application filed June 28, 1915. Serial No. 36,821.

*To all whom it may concern:*

Be it known that I, EDMUND S. BOYER, a citizen of the United States, residing at Somersworth, in the county of Strafford and State of New Hampshire, have invented certain new and useful Improvements in Plant-Growth Promoters; and I do declare the following to be a full, clear, and exact description of the invention, such as will enable others skilled in the art to which it appertains to make and use the same.

My invention relates broadly to improvements in plant culture and more particularly to portable glass housing for growing plants, such housing being constructed of a number of lights, and frames retaining the same, the frames and lights being capable of assemblage in any one of a number of forms to be hereinafter set forth.

The object of the invention is to provide a device of the class set forth which although being comparatively simple and inexpensive, will be extremely efficient and durable in use and will possess a number of advantageous characteristics.

With this general object in view, the invention resides in certain novel features of construction and in unique combinations of parts hereinafter fully described and claimed.

In describing the invention, I shall refer to the accompanying drawings wherein similar reference characters designate corresponding parts throughout the several views and wherein:—

Figure 1 is a perspective view of one type of housing; Fig. 2 is a perspective view of the frame used in the construction of such housing; Figs. 3 and 4 are detail horizontal sections as seen along the planes indicated by the lines 3—3 and 4—4 of Fig. 1; Fig. 5 is a view similar to Fig. 1 but illustrating the frames disclosed in this last named figure in combination with additional cover holding frames, and a slightly different arrangement of lights; Fig. 6 is a perspective view showing the arrangement of frames used when constructing the housing as disclosed in Fig. 5; Fig. 6ª is a perspective view of a cover supporting frame to be described; Fig. 7 is a perspective view showing an additional type of housing; Fig. 8 is a perspective view of the assemblage of frames employed when constructing the device as shown in Fig. 7; Fig. 9 illustrates yet another type of housing in perspective; Fig. 10 illustrates the frames employed in Fig. 9; Fig. 11 discloses in perspective, yet another form of the invention; Fig. 12 is a perspective view illustrating the frames applied to use as shown in Fig. 11; Fig. 13 is a diagram showing an arrangement of parts to be hereinafter described; Fig. 14 is substantially a duplicate of Fig. 1 and illustrates the application of a roof and a pair of roof supporting frames thereto; Fig. 15 is a perspective view of a portion of the housing disclosed in Fig. 14 with the roof proper removed to more clearly illustrate the construction of the roof supporting frames; Fig. 16 is a top view of one of these frames.

In Figs. 1, 2, 3, 4, 5, 6, 7, 8 and 14, each numeral 1 designates a substantially rectangular light-holding frame, but since the construction of all of these frames is identical, but one will be described in detail.

Each frame 1 comprises a pair of spaced parallel side bars 2 which are formed of wire and are bowed outwardly intermediate their ends as disclosed at 3 whereby to provide spring means connecting the opposite ends of said bars. The wire at the opposite ends of the bars 2, is coiled whereby to provide alined eyes 4, the wire being then bent inwardly at right angles to form the ends 5 of additional side bars yet to be described. After forming the ends 5, the wire is bent outwardly at right angles, constitutes clip arms 6 disposed in the same plane with the bars 2, is coiled whereby to provide additional alined eyes 7, and is then again extended inwardly, thus forming additional clip arms 8 which are disposed parallel to and in close proximity to the arms 6. The inner ends of the clip arms 8 are connected by the additional side bars 9 which are disposed at right angles to the side bars 2 and which preferably have their intermediate portions bent laterally to provide a pair of arms 10 on each bar 9, the outer ends of such arms being spaced whereby to provide loops or eyes 11, while the remaining portions of said bars are twisted together, whereby the two arms 10 of each bar 9 constitute one main arm 12.

Although the frames 1 are illustrated in the numerous figures above mentioned, all of the reference characters included in the specific description of said frames are applied only on Sheet 1 of the drawings, although the several parts of such frames which must necessarily be mentioned in the description of the numerous figures, will be given the same reference characters applied thereto on said sheet and in the aforesaid description.

Before proceeding with a lengthy exposition clearly setting forth several of the numerous uses of the frames 1, it may be well to more clearly define utility of the novel features of construction possessed by said frames. To this end, we will first consider the outwardly bowed portions 3 of the side bars 2 but in so doing we must first understand that rectangular panes of glass or lights (designated at L in all of the figures of the drawings), are to be gripped between the clip fingers 6 and 8, it thus becoming expedient to provide simple means whereby the ends of the clips formed by said fingers (the coils or eyes 7) may be held in close contact with the edges of said lights. It is for the attainment of this result, that the bars 2 are provided with the portions 3, the latter serving to render said bars yieldably extensible and contractible longitudinally.

The eyes 4 and 7 are designed for the reception of rectilinear pliable coupling rods 13 which may be inserted through said eyes in any of the manners hereinafter described for producing frame assemblages of different types. However, the eyes 7 act not only as means for the reception of the rods 13, but serve to yieldably connect the arms 6 and 8 of the clips, whereby more resiliency is imparted to such clips than can well be otherwise obtained.

Although the exact uses, advantages and utility of the two twisted arms 12 and the eyes 11 thereon, cannot be fully understood without reference to the descriptive matter relating to the several independent figures of the drawings, it may be here explained that the arms in question are pliable and that the loops or eyes 11 are of such size as to receive stakes or other appropriate anchors 14 (see Figs. 7 and 8).

With the foregoing general understanding of the preferred type of light-holding frame in mind, the several different manners in which a number of said frames may be connected to produce different styles of frame assemblages may be more readily understood.

Fig. 1 discloses a plurality of lights L standing upright and disposed edge to edge, such lights being circumscribed by a chain of frames, such frames being disclosed in this figure as having their eyes 7 alined and as receiving rods 13 whereby the several frames are pivotally and detachably, yet reliably connected. Needless to say, in this figure of the drawings, the lights are held between the clip arms 6 and 8 and the coils 7 are forced into contact with the edges of the lights. For a clearer illustration of this arrangement, however, reference may be made to Fig. 4, which view is cut horizontally on the plane designated by the line 4—4 of Fig. 1.

Coacting with the eyes 7 and rods 13 which connect the several corners of the housing formed in the manner just described, but serving as bracing means rather than as fasteners, are the pliable arms 12 which are shown as extending through the spaces between the adjacent edges of the lights L and as bent into contact with the outer sides of such lights (see not only Fig. 1 but Fig. 3). It is to be observed that by so doing, any tendency of the several frames toward parallelogrammatic movement will be resisted, thus causing the housing to retain its original shape at all times.

In Figs. 5 and 6, two frames 1 are shown spaced from each other and as employed in conjunction with a pair of cover-holding frames 15, but before setting forth the relation between these different types of frames, one of the frames 15 will be described, such frame being illustrated in detail in Fig. 6$^a$. In this last named figure, the frame 15 is shown as comprising two upright and a horizontal side bar 9$^a$ which are bent outwardly at intervals to provide parallel clip arms 6$^a$ and 8$^a$ connected by coils or eyes 7$^a$. After being bent into the formation just mentioned and disclosed in Figs. 5, 6 and 6$^a$, the opposite ends of the wire forming the frame 15 are bent laterally inward at right angles as disclosed at 16, thus forming in effect, supporting feet.

To produce the type of housing disclosed in Fig. 5, one frame 15 is disposed parallel to each frame 1 and the eyes 7$^a$ on the upright side bars 9$^a$ are alined with the eyes 7 carried by the upright bars 9, whereupon the rods 13 are inserted through said alined eyes. Thus the clip arms 6 and 8 of the frames 1 may grip the end lights L, while the arms 6$^a$ and 8$^a$ retain therebetween the lights employed upon the sides of the housing, the top light or cover having its opposite ends held between the clip arms 6$^a$ and 8$^a$ on the horizontal side bars 9$^a$. It is not essential in this style of housing, that the arms 12 be bent as in Fig. 1 since the light L constituting the cover of said housing effectively braces the same, but if it is found desirable, the aforesaid arms may be so used.

The styles of housings so far described are of rectangular contour, but by the use of the frames 1 connected in pairs and positioned with one of their arms 12 downwardly, upwardly converging lights L may be held in position to provide a peaked or tent-shaped cover. When so doing, the eyes 7 on each pair of frames are alined and one of the rods 13 is inserted therethrough as clearly shown in Figs. 7 and 8, and the stakes 14 are then driven through the loops or eyes 11 as likewise illustrated in these figures, thus anchoring the devices.

When several of the devices are assembled in the manner set forth in the preceding paragraph, the eyes 4 of the frames 1 protrude from the opposite ends of such devices an appropriate extent to allow the eyes of adjacent devices to be alined, whereupon other rods may be inserted through said eyes in inclined positions (see more particularly the right hand end of Fig. 8), thus reliably connecting a train of the housings in the manner suggested in Fig. 7. If found necessary, the lowermost eyes 4 of the frames 1 at the extreme ends of such train, or at other appropriate points, may be connected by transversely extending rods 17 having hooked pliable ends 18 received by said eyes.

The foregoing description will give a clear understanding of the utility and advantages to be gained by the use of a plurality of frames 1, but it is to be understood that they may possibly be assembled in numerous other manners with which the present application need not be encumbered. Furthermore, the invention is not confined to frames constructed in the manner previously described but is capable of embodiment in numerous forms, one of which is depicted in Figs. 9 and 10.

In the figures last named, 19 indicates broadly a pair of wire end frames which comprise a pair of upright side bars $9^b$ which are connected at their upper ends by a pair of upwardly converging bars $9^c$. Intermediate their ends, but disposed only slight distances therefrom, the wire side bars $9^b$ are bent outwardly into the form of U clips $6^b$ whose ends are connected by coils or eyes $7^b$. Similarly, the intermediate portions of the inclined bars $9^c$ are formed with clips $6^c$ projecting in the same direction as and disposed parallel to the clips $6^b$, the arms of the several clips $6^c$ being connected by coiled eyes $7^c$.

The type of frame just described, in addition to the features mentioned, is provided with inclined U-shaped seats 20 at the juncture of the bars $9^b$ and $9^c$, such seats preventing downward slipping of a pair of upwardly converging lights L whose ends are inserted into the clips $6^c$ and whose lower edges rest in said seats when a structure such as that disclosed in Fig. 9 is to be provided. An additional pair of upright elongated lights L complete the structure in question, the ends of said last named lights being gripped in the clips $6^b$. This style of housing, like that disclosed in Fig. 7, may be duplicated in longitudinal rows, in which case the eyes $7^b$ and $7^c$ would serve as means for the reception of the rods 13. Whether the devices be employed as single units or in trains, however, certain of the eyes $7^b$ of the clips $6^b$ are preferably connected by the rods 17 applied as set forth in the description of Figs. 7 and 8.

In Figs. 11, 12 and 13, the construction of the frames 21 is identical with that of the upper portions of the frames 19, with the exception that the seats 20 are omitted and the ends of the wire are here extended inwardly to provide feet 22. In this type of frame also, certain of the eyes on the ends of the clips may be connected by transverse rods 17 if so desired. The frames 21 are applied to use as clearly disclosed in Fig. 11 and be coupled one to the other by the proper insertion of certain rods 13 through the eyes at the ends of the spring clips.

For the purpose of intensifying heat within the housings, especially within those depicted in Figs. 7 and 11, the devices may be superimposed one over the other as illustrated in diagram, in Fig. 13. Although this figure indicates a device of inverted V-shaped formation, it will be clearly understood that the other types of the invention may be similarly applied to use for the attainment of the same ends.

Disclosed in Figs. 14 and 15, is an upright rectangular housing 23 which includes the same construction shown in Fig. 1 with the addition of a peaked roof 24, the latter being composed of two upwardly converging rectangular lights L and two triangular end or gable lights L', such lights being held by a pair of inverted V-shaped wire end frames 25, disclosed most clearly in Figs. 15 and 16. Each of the frames comprises a pair of upwardly converging side bars $9^d$ having their lower ends bent to form seats $20^a$ to receive therein the roof lights, while the free ends of said seats are formed into hooks 26 designed to rest on the upper edges of two of the upright lights of the housing as shown in Fig. 15. The upper ends of the side bars $9^d$ are preferably though not necessarily, twisted together as at 27 to provide appropriate handles, while their intermediate portions are bent outwardly at intervals into the form of a U-shaped clip $6^d$ and immediately adjacent such clips, the bars are formed into additional clips $6^e$ disposed at right angles to the clips $6^d$ and adapted to receive therein the triangular end lights L'. Although the roof constructed by the use of the frames 25 is primarily adapted for use as disclosed in Fig. 14, it will be evident that the same might well be used as an independent tent-shaped housing.

In the preceding, several forms of frames and numerous assemblages thereof have been described, and in the accompanying drawings, the same have been illustrated, but it will be readily understood that I need not be restricted thereto otherwise than to the extent to which the appended claims limit me.

Regardless of the shape and the manner in which the devices are constructed, they will be extremely efficient and will greatly promote the growth of any plants over which they may be disposed. During the seasons when their use is unnecessary, the connected frames may be readily disassembled and stored, it being evident that such frames may be stacked one upon the other as may likewise the several lights L and L'.

From the foregoing description, taken in connection with the accompanying drawings, it is thought that the several forms, uses and advantages of the invention will be readily understood to those skilled in the art to which the invention relates without requiring a more extended description or exposition.

I claim:

1. In a growth promoter, a light-holder comprising a pair of side members having thereon light-holding clips to engage the opposite edges of a light, a bar connecting the aforesaid side members, and a spring connecting the two end portions of said bar.

2. In a growth promoter, a light-holder comprising a pair of side members having thereon light-holding clips to engage the opposite edges of a light, and a bar connecting the aforesaid side members and having a portion of its length bent to form a spring.

3. In a growth promoter, a light-holder comprising a substantially rectangular frame composed of a pair of parallel side bars having thereon clips to engage the opposite edges of a light, an additional pair of side bars connecting the aforesaid bars, and spring means uniting the opposite end portions of said additional bars.

4. In a growth promoter, a light-holding frame comprising a pair of parallel side bars formed of wire, the wire at the ends of the bars being bent inwardly at right angles to constitute the ends of additional side bars, such ends being in turn bent outwardly at right angles to provide clip arms disposed in the same plane with the aforesaid side bars, the ends of said clip arms being extended inwardly to provide additional clip arms disposed parallel to and in close proximity to the aforesaid arms, and additional wire side bars disposed at right angles to the aforesaid bars and connected at their ends to the inner ends of the additional clip arms.

5. In a growth promoter, a light-holding frame comprising a pair of parallel side bars formed of wire and having their intermediate portions bowed outwardly to render them yieldably extensible and contractible, the wire at the ends of the bars being bent inwardly at right angles to constitute the ends of additional side bars, such ends being in turn bent outwardly at right angles to provide clip arms disposed in the same plane with the aforesaid side bars, the ends of said clip arms being extended inwardly to provide additional clip arms disposed parallel to and in close proximity to the aforesaid arms, and additional wire side bars disposed at right angles to the aforesaid bars and connected at their ends to the inner ends of the additional clip arms.

6. In a growth promoter, a light-holding frame comprising a pair of parallel side bars formed of wire, the wire at the ends of the bars being coiled and then bent inwardly at right angles to constitute the ends of additional side bars, such ends being in turn bent outwardly at right angles to provide clip arms disposed in the same plane with the aforesaid side bars, the ends of said clip arms being extended inwardly to provide additional clip arms disposed parallel to and in close proximity to the aforesaid arms, and additional wire side bars disposed at right angles to the aforesaid bars and connected at their ends to the inner ends of the additional clip arms.

7. In a growth promoter, a light-holding frame comprising a pair of parallel side bars formed of wire, the wire at the ends of the bars being bent inwardly at right angles to constitute the ends of additional side bars, such ends being in turn bent outwardly at right angles to provide clip arms disposed in the same plane with the aforesaid side bars, the ends of said clip arms being coiled and then extended inwardly to provide additional clip arms disposed parallel to and in close proximity to the aforesaid arms, and additional wire side bars disposed at right angles to the aforesaid bars and connected at their ends to the inner ends of the additional clip arms.

8. In a growth promoter, a light-holding frame comprising a pair of parallel side bars formed of wire, the wire at the ends of the bars being bent inwardly at right angles to constitute the ends of additional side bars, such ends being in turn bent outwardly at right angles to provide clip arms disposed in the same plane with the aforesaid side bars, the ends of said clip arms being extended inwardly to provide additional clip arms disposed parallel to and in close proximity to the aforesaid arms, and additional wire side bars disposed at right angles to the aforesaid bars and connected at their ends to the inner ends of the additional clip arms, the intermediate portions of said additional side bars being bent outwardly and twisted to form arms substantially as and for the purposes defined.

9. In a growth promoter, a light-holding frame comprising a pair of parallel side bars formed of wire and having their intermediate portions bowed outwardly to render them yieldably extensible and contractible, the wire at the ends of the bars being coiled and then bent inwardly at right angles to constitute the ends of additional side bars, such ends being in turn bent outwardly at right angles to provide clip arms disposed in the same plane with the aforesaid side bars, the ends of said clip arms being coiled and then extended inwardly to provide additional clip arms disposed parallel to and in close proximity to the aforesaid arms, and additional wire side bars disposed at right angles to the aforesaid bars and connected at their ends to the inner ends of the additional clip arms, the intermediate portions of said additional side bars being bent outwardly and twisted to form arms, substantially as and for the purposes defined.

10. In combination, a plurality of lights assembled into the form of a housing, and supporting means for said lights consisting of a plurality of wire frames gripping said lights and having portions of certain of their side bars bent to form eyes, the eyes on one frame being alined with those on the adjacent frame, and removable fastening members inserted into said alined eyes.

11. In combination, a plurality of lights disposed edge to edge in the form of a poly-sided housing, frame members gripping the several lights and likewise disposed edge to edge, and releasable connecting means uniting the adjacent edges of said frames.

12. In combination, a plurality of lights disposed edge to edge in the form of a poly-sided housing, frame members gripping the several lights and likewise disposed edge to edge, eye members on the adjacent edges of said frames, and connecting elements inserted removably into said eye members.

13. In combination, a plurality of upstanding lights disposed edge to edge and forming a continuous poly-sided wall, and a chain of pivotally connected wire frames circumscribing said wall and having light-gripping members receiving the edges of the lights.

14. In combination, a plurality of lights disposed edge to edge and forming a housing, wire frames clipped on said lights and likewise disposed edge to edge, and pliable wire arms on the edges of the frames bent around the corners of the housing.

15. In combination, a housing including a plurality of upstanding lights, connected wire frames clipped on and retaining said lights in fixed relation, a pair of alined inverted V-shaped frames having feet resting on the upper edges of two of the lights, inwardly opening spring clips on the inclined bars of the two inverted V-shaped frames, and a pair of upwardly converging lights gripped at their ends in said clips, whereby to provide a roof for the aforesaid housing.

In testimony whereof I have hereunto set my hand in presence of two subscribing witnesses.

EDMUND S. BOYER.

Witnesses:
MYRTLE BREWSTER,
MARION I. FOGG.

Copies of this patent may be obtained for five cents each, by addressing the "Commissioner of Patents, Washington, D. C."